United States Patent [19]

McPherson

[11] 4,322,108

[45] Mar. 30, 1982

[54] CONVERTIBLE VEHICLE

[76] Inventor: William L. McPherson, 3669 Lauria Rd., Bay City, Mich. 48706

[21] Appl. No.: 146,511

[22] Filed: May 5, 1980

[51] Int. Cl.³ .............................................. B60P 3/42
[52] U.S. Cl. ................................................... 296/164
[58] Field of Search ................. 296/156, 164, 10, 166, 296/167, 35.3

[56] References Cited

U.S. PATENT DOCUMENTS

| | | | |
|---|---|---|---|
| 2,001,619 | 5/1935 | Levoyer | 296/164 |
| 3,419,242 | 12/1968 | Gossett | 296/164 |
| 3,532,236 | 10/1970 | Hostetler | 296/164 |
| 3,547,480 | 12/1970 | Ward | 296/164 |
| 3,586,119 | 6/1971 | Chuchus et al. | 296/166 |
| 3,719,244 | 3/1973 | Miller et al. | 296/164 |
| 3,741,605 | 6/1973 | Lee | 296/10 |
| 3,817,545 | 6/1974 | Ward | 296/164 |

FOREIGN PATENT DOCUMENTS 2709169 9/1978 Fed. Rep. of Germany ...... 296/164

*Primary Examiner*—Joseph F. Peters, Jr.
*Assistant Examiner*—Ross Weaver
*Attorney, Agent, or Firm*—Learman & McCulloch

[57] ABSTRACT

A van-type vehicle has a portion of its body cut to form a shell which selectively may be fitted to or removed from the van. When the shell is removed a camper unit may be removably coupled to the van to provide motorized living accommodations.

7 Claims, 9 Drawing Figures

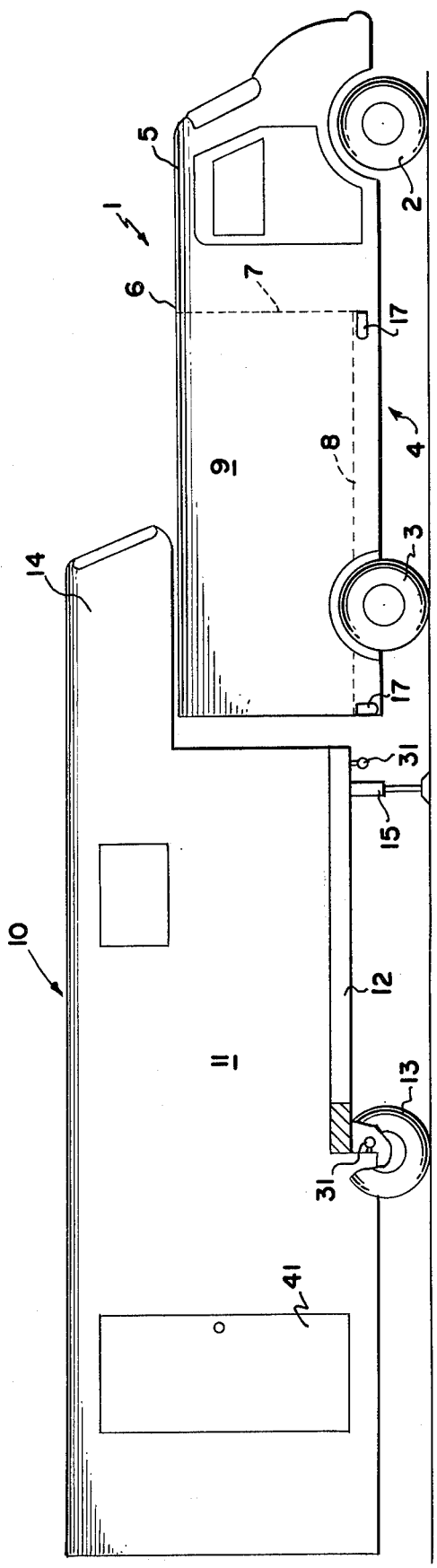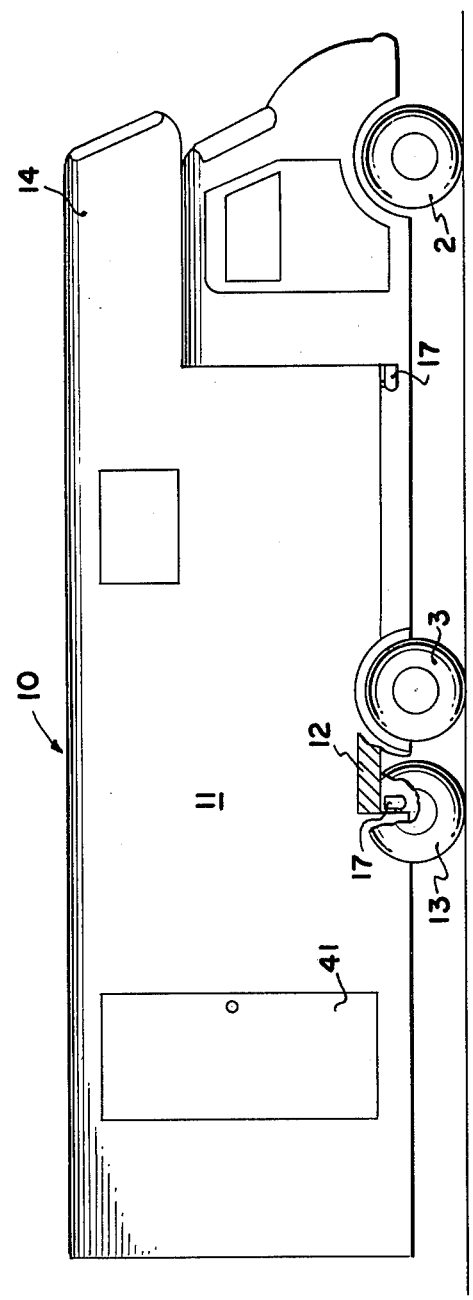

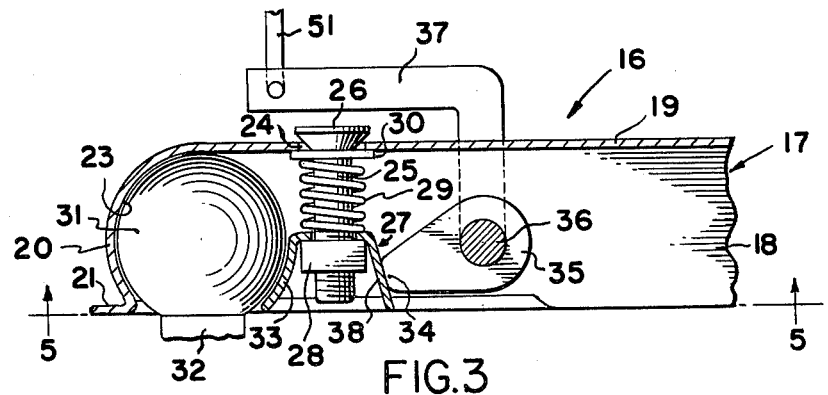
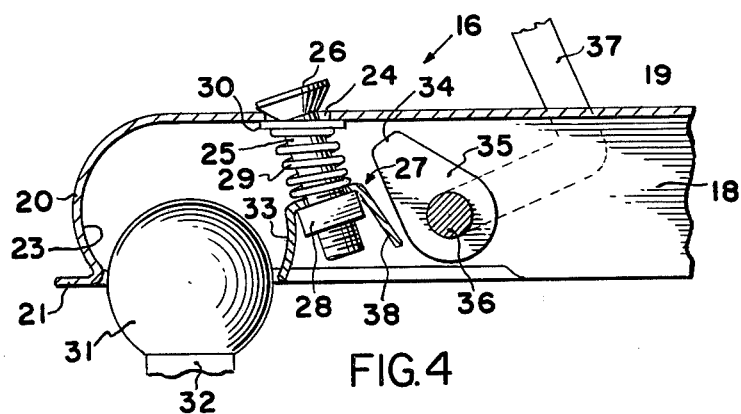
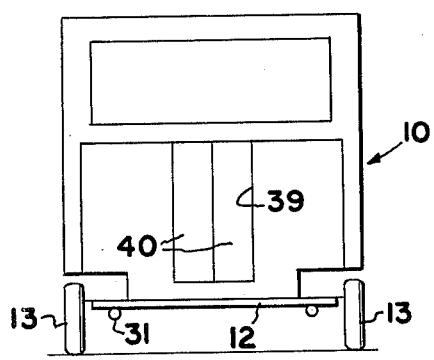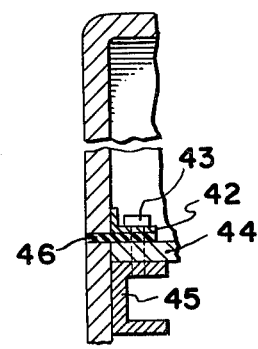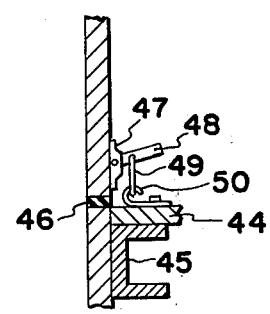
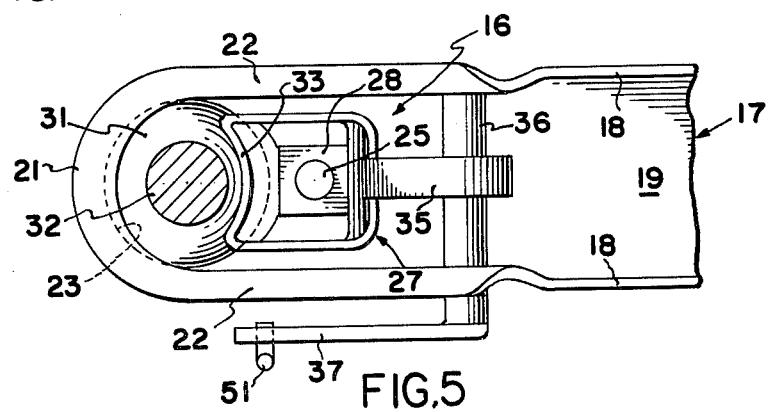

4,322,108

CONVERTIBLE VEHICLE

BACKGROUND OF THE INVENTION

Certain kinds of vehicles, such as pickup trucks, are adapted to be fitted with or coupled to a unit provided with living accommodations. The arrangement is such that the truck may be used either in conjunction with or independently of the living accommodations unit. Typical of such vehicles and units are those disclosed in Prater U.S. Pat. No. 3,684,048; Miller et al U.S. Pat. No. 3,719,244; and Ward U.S. Pat. No. 3,817,545. According to the invention, a production vehicle, such as a van, is convertible from van configuration to one fitted with a living accommodations unit, and vice versa, thereby enabling the vehicle to be used in either mode.

SUMMARY OF THE INVENTION

A production van-type vehicle is cut rearwardly of the driver's seat transversely and downwardly toward the van floor, and then horizontally rearwardly parallel to the floor to form a removable shell. The confronting edges of the van body and the shell are provided with layers of insulation and separable fasteners to enable the shell to be removably retained as part of the van when desired. The fasteners may be separated, however, to enable removal of the shell, following which a wheeled camper body may be coupled to the remaining van structure. Coupling devices carried by the van structure and the camper unit secure the two together to enable the camper unit to be supported and towed by the van. The van thus is usable selectively as a van or as part of the camper unit.

DESCRIPTION OF THE DRAWINGS

Apparatus constructed in accordance with a preferred embodiment of the invention is illustrated in the accompanying drawings, wherein:

FIG. 1 is a side elevational view, partly in section, of a van and camper unit prior to their being coupled to one another;

FIG. 2 is a view similar to FIG. 1, but illustrating the van and camper unit coupled to one another;

FIG. 3 is an enlarged, sectional view illustrating one of a number of separable coupling devices used to couple and uncouple the camper unit to the van, the coupling unit being illustrated in its active or engaged condition;

FIG. 4 is a view similar to FIG. 3, but illustrating the coupling device in its disengaged condition;

FIG. 5 is a sectional view taken on the line 5—5 of FIG. 3;

FIG. 6 is a front elevational view of the camper unit when the latter is uncoupled from the van;

FIGS. 7 and 8 are sectional views taken on the lines 7—7 and 8—8 of FIGS. 1 and 2, respectively.

DETAILED DESCRIPTION

Figure 9:
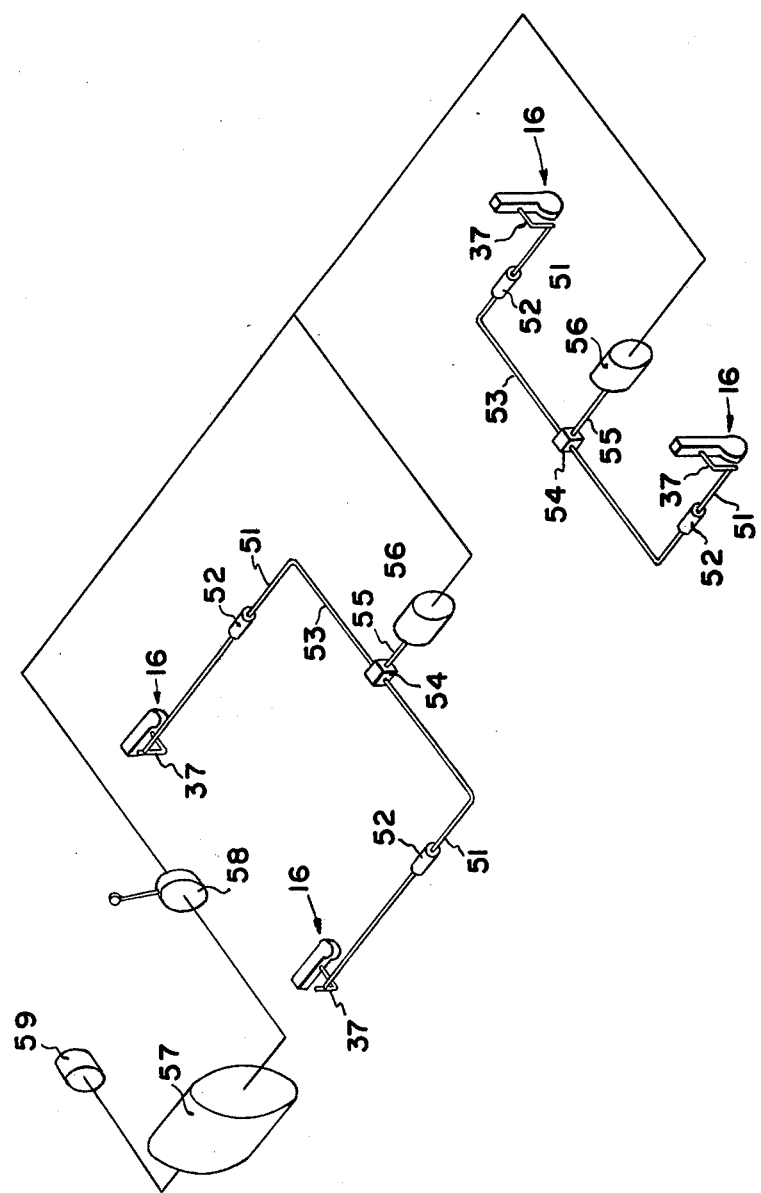
FIG. 9 is a schematic diagram of apparatus for remotely actuating the coupling devices.

The invention is adapted in use for conjunction with a motorized vehicle 1 of the van type having steerable front wheels 2, driving rear wheels 3, and a closed body 4 having a driver and front seat passenger compartment 5 and a closed rear body section 6 for the accommodation of cargo or passengers. The body is cut from the roof toward the chassis along a vertical line 7 and along a horizontal line 8 at or adjacent the van floor to form a body shell 9 which may be separated from the remainder of the van.

Adapted for use in conjunction with the van when the shell 9 is removed from the latter is a camper unit 10 having a closed body 11 the interior of which is provided with living accommodations. The unit 10 has lower frame members 12 on which are mounted ground engaging wheels 13, the height of the frame 12 above ground level being such as to enable it to overlie the chassis or floor of the van 1. The spacing between the wheels 13 preferably is greater than that between the rear wheels of the van, thereby enhancing the lateral stability of the camper unit. The unit 10 may, if desired, include a forwardly projecting extension 14 that is adapted to overlie the compartment 5 of the van.

The camper unit 10 preferably carries adjacent the forward end of the frame 12 vertically adjustable jacks 15 which, together with the wheels 13, provide support for the unit 10 when the latter is disassociated from the van 1.

Separable coupling means 16 is provided to enable the unit 10 to be coupled to the van 1 when the shell 9 is removed. Each coupling is the same and comprises an elongate, generally U-shaped body 17 having substantially parallel side walls 18 joined by an end wall 19. The walls 18 and 19 merge at one end of the body to form a semispherical portion 20 terminating in a forwardly extending lip 21. Adjacent the forward end of the body 17, the side walls 18 are rolled inwardly toward one another and then reversely rolled to form outwardly extending flanges 22 which merge smoothly with the lip 21. The arrangement is such that the walls at the forward end of the body form three sides of a socket 23.

Adjacent the forward end of the body 17, but spaced rearwardly from the wall 20, the end wall 19 is provided with an oversized opening 24 through which extends the shank of a bolt 25 having a tapered head 26. Carried by the bolt 25 is a latch member 27 which is slidable longitudinally of the bolt shank and is retained in a selected position longitudinally thereof by means of a nut 28 that is threaded on to the shank. A compression spring 29 reacts between the latch member 27 and a washer 30 bearing against the inner surface of the end wall 19 so as to maintain the member 27 tightly against the nut 28. The spring 29 normally maintains the bolt 25 in a position normal to the end wall 19, but the bolt is capable of orbital movement as permitted by the configuration of the bolt head 26 and the oversizing of the opening 24.

Adapted for removable accommodation in each of the body members 17 is a generally spherical ball 31 that is fixed at one end of a post 32 which, in turn, is fixed to the camper unit frame 12 in a manner to be described. The ball 31 is adapted to be accommodated removably in the socket 23 at the forward end of the body 17 and has a radius corresponding substantially to that of the nose portion 20. Thus, the ball 31 may nest with the nose portion 20, as is shown in FIG. 3.

The latching member 27 includes an arcuate tongue or flange 33 spaced from and confronting the wall 20. The radius of the flange approaches that of the ball 31 so as to be capable of nesting with the ball when the latter is in the position shown in FIG. 3. The flange 33 forms the fourth side of the socket 23.

Since the latch member 27 is capable of orbital movement relative to the body 17 it is necessary that the latch member be forcibly restrained against movement away from the ball 31 when the latter is to be retained in the body 17. Accordingly, the coupling means 16 includes a locking cam 35 which is fixed to a shaft 36 that spans and is journaled in the side walls 18 and is connected to an operating lever 37. The locking cam 35 has a nose 34 that is adapted to bear against a skirt 38 forming part of the latch member 27, the nose having a flat surface which may bear against the skirt 38 and maintain the arcuate flange 33 snugly against the ball 31. Rocking of the lever 37 clockwise from the position shown in FIG. 3 to the position shown in FIG. 4, however, withdraws the locking cam 35 from the latching member 27, thereby enabling movement of the ball 31 out of the body 17.

The front wall of the camper unit 10 has a doorway 39 therein which may be closed by sliding doors 40. Weather seals (not shown) are interposed between the edges of the van body and the camper unit. The doorway provides access between the van compartment 5 and the interior of the camper unit 10 without necessitating a person's going outside of the combined unit. A door 41 in one of the sidewalls 11 of the unit 10 provides additional access to the interior of the unit.

Since the shell 9 cut from the van is intended to remain at times with the van, means is provided to secure the shell to the van. Such means may include an angle iron 42 or the like adjacent the edges of the shell and provided at spaced intervals with bolts 43 which may be threaded into openings extending through the van floor 44 into the van frame 45. A strip of insulating material 46 may be interposed between the confronting edges of the shell and the van to provide a weather seal. Alternatively, the angle irons 42 and bolts 43 may be replaced by clasps each of which has a body 47, a pivoted arm 48, and a loop 49 pivoted to the arm 48 and adapted to accommodate an anchor hook 50 fixed to the floor 44. Other kinds of separable retaining devices may be employed to enable the shell 9 to be retained on the van 1.

The coupling devices 16 by means of which the camper unit 10 separably may be coupled to the van 1 preferably are four in number. Two are located on opposite sides of the van body 6 below the cut line 8 with the sockets 23 facing upwardly. The other two are located on opposite sides of the van at the rear of the latter, and below the cut line 8, with their sockets 23 facing rearwardly. There also are four ball coupling members 31 carried by the camper unit 10, two of them being located adjacent the forward end of the camper frame 12 so as to be capable of registering in a vertical plane with the two forwardmost coupling members 16 carried by the van 1. The other two ball members 31 are carried by the camper unit 10 adjacent opposite sides of the van in a position to register in a horizontal plane with the rearward coupling units 15 carried by the van. Such ball coupling members 31 project forwardly so as to be accommodated within the rearward members 15 carried by the van.

It will be understood that, when coupling the unit 10 to the van 1, the jacks 15 support the camper in a position to enable the rear portion of the van to be driven under the frame 12 and effect vertical registration of the forward ball units 31 of the camper with the associated coupling devices 16 of the van and to enable the rearward ball units 31 of the van to be accommodated in the associated coupling devices 16 at the rear of the van. Thereafter, the jacks 15 may be contracted to enable the ball members 31 at the forward end of the camper to be accommodated in the associated coupling devices 16.

The coupling devices 16 preferably may be remotely operated from within the van compartment 5 by a pneumatically powered drive system such as that disclosed schematically in FIG. 9. In the disclosed embodiment the operating lever 37 of each locking cam 35 is connected to an arm 51 which extends through a guide 52 and is joined to an operating bar 53 that is connected by a fitting 54 to a displaceable plunger 55 forming part of a pneumatic valve 56. The valves 56 are coupled to a compressed air tank 57 via a valve 58 which is operable, depending upon its position, to extend and retract the plungers 55 of the valves 56. The tank 57 is supplied with compressed air by means of a pump 59 which may be energized from the electrical system of the van 1.

In one position of the valve 58, the operating levers 37 are in the latch locking position shown in FIG. 3, whereas in the second position of the valve 58 the locking levers are in the latch releasing position shown in FIG. 4.

The disclosure is representative of a presently preferred embodiment of the invention, but is intended to be illustrative rather than definitive thereof. The invention is defined in the claims.

I claim:

1. A vehicle convertible from a van to a camper and vice versa, said vehicle having a wheeled frame supporting a van body having a driver's compartment at its forward end and passenger or cargo space rearwardly of said compartment, said body being cut vertically aft of said compartment and horizontally adjacent said frame to form a separable body section; separable means cooperable between said section and the remainder of said body for separably coupling said section to the remainder of said body; a wheeled camper unit having a body adapted to overlie said frame when said separable body section is removed from said frame; a first set of coupling devices carried by said frame, a first group of the coupling devices of said first set being located adjacent said compartment and a second group thereof being located rearwardly of said compartment; a second set of coupling devices carried by said camper and corresponding in number to the number of coupling devices of said first set and being located in positions to register with the coupling devices of said first set when said camper is in a position to be coupled to said frame; movable latch means carried by each coupling device of one of said sets and being movable into and out of locking engagement with the associated coupling device of the other of said sets; power driving means; and means connecting said driving means and the latch means of all of the coupling devices of said one of said sets for moving all of said latch means simultaneously into and out of said locking engagement, the coupling devices of one of said first or second groups registering in a vertical plane and the coupling drives of the other of said groups registering in a horizontal plane.

2. A vehicle according to claim 1 wherein said camper unit has a forward wall spanning said van body rearwardly of said compartment, said forward wall having a doorway therein.

3. A vehicle according to claim 2 including a door occupying said doorway.

4. A vehicle according to claim 1 wherein said camper unit has its wheels adjacent the rear end and at opposite sides of said unit, the wheels of said camper unit being located rearwardly of the rear wheels of said frame when said camper unit is coupled to said frame.

5. A vehicle according to claim 1 wherein said frame has spaced apart wheels adjacent its rear end and said camper unit has spaced apart wheels adjacent its rear end, the spacing between the rear wheels of said camper unit being greater than the spacing between the rear wheels of said frame.

6. A vehicle according to claim 1 wherein each of the coupling devices of one of said sets comprises a body having a socket therein and wherein each of the coupling devices of the other of said sets comprises a ball of such size as removably to be accommodated in the socket of the associated coupling device of said one of said sets.

7. A vehicle according to claim 6 wherein each body having a socket therein is carried by said frame and each ball is carried by said camper.

* * * * *